United States Patent [19]
Sears et al.

[11] 3,716,135
[45] Feb. 13, 1973

[54] SORTING DEVICE

[75] Inventors: Noel C. Sears, Becket; Roland G. Remillard, North Adams, both of Mass.

[73] Assignee: Sprague Electric Company, North Adams, Mass.

[22] Filed: Sept. 16, 1970

[21] Appl. No.: 72,713

[52] U.S. Cl. ..........................209/74, 193/31, 193/39
[51] Int. Cl. ..............................................B07c 3/02
[58] Field of Search ....................209/74; 193/31, 39

[56] References Cited

UNITED STATES PATENTS

| 3,016,142 | 1/1962 | Brown | 209/74 R |
| 3,080,033 | 3/1963 | Scott | 193/31 R |

*Primary Examiner*—Richard A. Schacher
*Attorney*—Connolly and Hutz and Vincent H. Sweeney

[57] ABSTRACT

Sorting apparatus for individual elements comprising an aperture and a shiftable body having a plurality of separate chutes each associated with a respective receptacle. The elements are passed individually through the aperture and are received in one of the chutes of the shiftable body which chute delivers the element to the respective receptacle. This delivery through the chute takes place while the shiftable member may be undergoing repositioning. While one element is in the process of being delivered to a predetermined receptacle, the procedure may be underway for receiving the next succeeding element and passing the next element to a different predetermined receptacle.

7 Claims, 2 Drawing Figures

SORTING DEVICE

BACKGROUND OF THE INVENTION

This invention relates to segregating of tested devices in accordance with classified characteristics and more particularly to the segregation by moving the devices quickly into selected repositories.

The sorting of tested devices involves the distribution of the devices after the determinations accomplished by the testing. The distribution is dependent on the number of parameters determined in the testing. If the test establishes only two classes, the distribution of the tested device involves delivery to only one of two classes. However, a greater number of classes will result from the determination of additional parameters. It is necessary therefore in some testing procedures to distribute tested devices into one of several repositories predetermined in accordance with the selection based on more than a single determination. In the case of this multiple repository distribution the distributing mechanism must be adapted to choose the proper repository according to the predetermination and move the tested device to this predetermined repository.

Further, the distributing means must move the tested device easily and quickly and with a positive action not prone to jamming. The distribution is of a mechanical nature even if the testing procedure may involve electrical or other non-mechanical tests as well as mechanical tests in making the determination. This essentially mechanical nature of the distribution to the proper repository introduces physical problems such as size and weight. Moreover, time is a factor in physically moving the tested devices.

It is desirable to sort devices as quickly as possible so that the mechanical collection of tested devices does not unduly prolong the testing procedure. It is also desirable to provide a distribution means which is readily responsive to the selectivity of the tests with a minimum of delay and inertia. Moreover, the distribution means should be simple in design and compatible with established techniques in sorting while providing the above-noted desirable improvements.

SUMMARY OF THE INVENTION

Apparatus is provided for sorting individual elements, particularly small discrete objects such as electrical components. An airborne shuttle means having a body of generally planar shape and a plurality of downwardly extending delivery chutes is surrounded by a number of air nozzles. The shuttle means has a major plane of movement generally horizontal or lateral to the generally vertical orientation of the delivery chutes. The shuttle means is resiliently mounted. Each air nozzle is arranged to blow a stream of air against a lateral surface of the shuttle which shuttle is so supported on an air bearing as to be readily moved horizontally in its major plane of movement by slight changes in air pressure from said air streams. The shuttle is suitably centered in the absence of air actuation by tensioned springs opposingly attached to the shuttle in such a way as to draw the shuttle to a central position in its major plane of movement. The shuttle is shiftable so as to bring the upper end of each chute in alignment with a common entrance aperture. Each delivery chute is associated with a separate repository. The lower end of each delivery chute and its respective repository are so dimensioned as to be co-extensive in all positions of the shuttle.

The common entrance aperture for passing the sorted objects to the shuttle means is formed in a member adjacent the shuttle member. The shuttle in its plane of movement defines a plane area and the entrance aperture lies within this plane area during the sorting operation.

It is an object of this invention to distribute selected articles quickly after testing.

It is another object of this invention to provide a simple apparatus for quickly delivering tested devices to various repositories as determined by results of tests of the devices.

DESCRIPTION OF DRAWINGS

These and other objects of this invention will be thoroughly understood on consideration of the following description taken together with the accompanying drawings in which.

DETAILED DESCRIPTION

Figure 1:
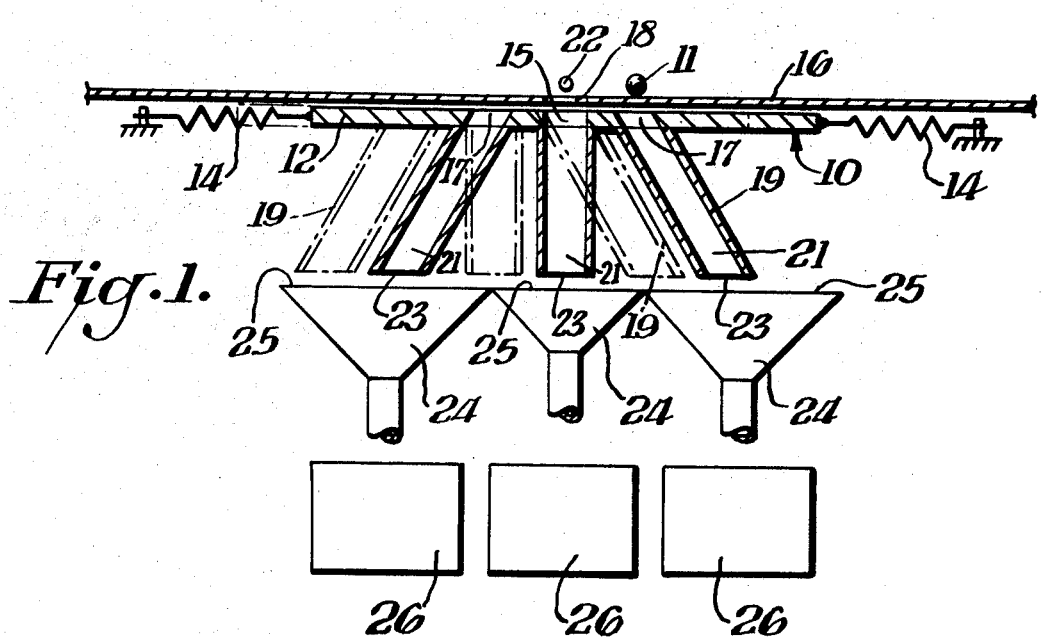
FIG. 1 is an elevational view of an embodiment of the apparatus of this invention showing a section through a shuttle member and superimposed table and representatively showing delivery means.

Referring first to FIG. 1 there is shown a sorter for automatically moving bodies from a testing position for some characteristic or characteristics to various respective receptacles in which tested bodies having the same respective characteristics are collected.

A table 16 has a central opening 18. Associated with the central opening 18 and slightly above it is a suitable means 22 for directing bodies into the central opening 18. Tested bodies moved into position can be delivered to the central opening 18. These tested bodies ready for collection in separated respective receptacles according to characteristics established by testing, are brought to the aperture 18.

Figure 2:
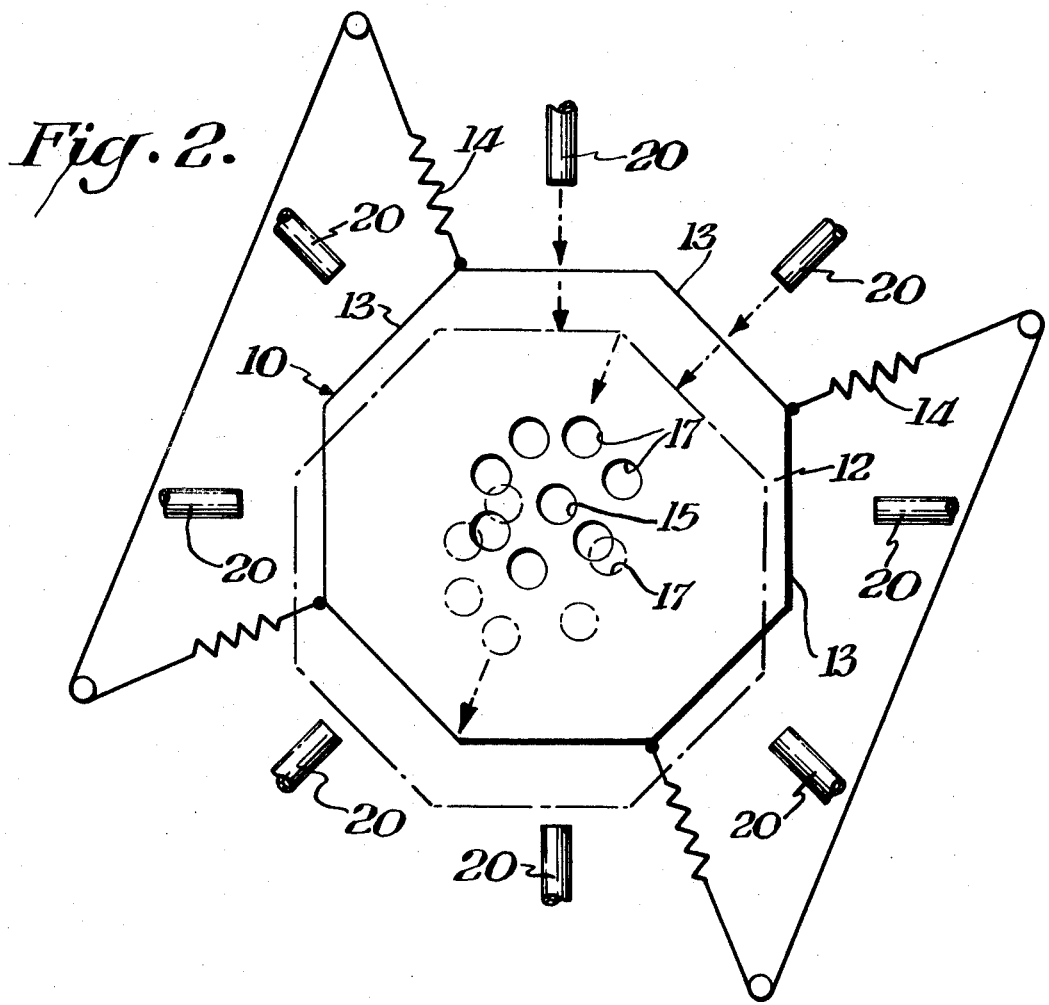
FIG. 2 is a plan view of the shuttle member.

From the aperture 18 the successive bodies are fed by gravity into a sorting mechanism which distributes the bodies to collection in various receptacles according to the classification of the bodies by the testing procedure. This sorting mechanism is comprised of a shuttle member 10 and means associated with the shuttle member for supporting and positioning the member 10, and an air bearing support. Referring to FIG. 2, the member 10 is held by springs 14 attached to sides 13 of a plate 12 of the member 10 so that it is centered with the plate 12 with its central aperture 15 positioned directly beneath the central opening 18.

The shuttle member 10 is made up of the plate 12 defined by sides 13. The plate 12 has formed thereon a number of apertures. The aperture 15 is centrally located and a number of apertures 17 are spaced radially outward of the plate 12 from the central aperture 15. A chute 19 is attached to the underside of the plate 12 at each of the apertures 15 and 17. These chutes 19 extend downwardly of the plate 12 and are integrally mounted on the underside of the plate 12 so that the plate 12 and the chutes 19 make up shuttle member 10 and as an integral unit are movable on the air bearing and in the spring positioning of springs 14. Each of the chutes 19 defines a passage 21 to a port 23 at the lower end of the respective chute. Catch basins 24 are positioned beneath the shuttle member 10 with one catch basin positioned in relation to each of the chutes 19. Each catch basin 24 has a wide mouth 25 provided by flaring out of the sides of the basin 24. The respective ports 23 and wide mouths 25 are positioned in relation to each other so that the port 23 is directly above the mouth 25.

The springs 14 are set to provide a lateral movement of the plate 12 within defined limits. This lateral movement is sufficient to enable the positioning of the side apertures 17 beneath the central opening 18 of the table 16 upon lateral movement of the shuttle member 10. This limit of lateral movement of the shuttle member 10 and the dimensioning and positioning of the ports 23 and the mouths 25 are interrelated so that each port 23 is superpositioned over at least a substantial part of its horizontal area over the opening of its respective mouth 25 for any lateral position of the shuttle member 10.

Referring to FIG. 2, air nozzles 20 are positioned laterally around the plate 12 each with an orifice 26 aligned so as to be able to direct an air blast against one of the sides 13 of the plate 12. The air pressure of the simultaneous air blasts from the two adjacent nozzles 20 cause the plate 12 to be driven in a lateral direction against the spring tension of the springs 14. This lateral driving of the plate 12 causes the apertures 15 and 17 to be moved and positioned with respect to the central opening 18.

A body 11 moved to the central opening 18 is receivable by the shuttle member 10 in one of the apertures 15 or 17 when positioned beneath the central opening 18 containing the body 11. The body 11 thus received by the particular aperture is quickly moved by gravity through the aperture and into the passage 21 of the respective chute 19 and down the passage 21 through its port 23 into the related catch basin 24, and thence to collection vessel 26.

OPERATION

In operation the tested bodies 11 are successively delivered into the central opening 18. Timed in synchronism with this positioning of the bodies in the central opening 18 is a controlled movement of the shuttle member 10 to place a selected aperture 15 or 17 beneath the opening 18. This control is provided by firing two adjacent air nozzles 20 against their respective sides 13 and moving the member 10 so that plate 12 is positioned with respect to table 16 with the aperture 17 nearest to the two fired jets 20 beneath the central opening 18. As a result the positioned body 11 passing through the aperture 17 is conducted down the respective chute 19 and into the respective catch basin 24. The air nozzles 20 are cut off allowing the shuttle member to return to the positioning tension of springs 14 so that deactivating of the air nozzles 20 tends to return the shuttle member 10 to a central position.

The operation of the air nozzles 20 with suitable air pressure means is actuated by suitable controls which in turn are sensitive to signals delivered from the detectors of the testing means. For example, the detectors may generate electrical impulses in accordance with characteristics of the tested bodies sensed by the detectors. These impulses may be arranged so as to provide the desired control. The characteristics determined by the testing means upon examination of the bodies 11 result in the signals from these detectors which conveyed to the suitable controls cause various air nozzles 20 to be actuated and through the air pressure of air blasts turned on by such actuation result in an appropriate movement of the shuttle member 10. This shuttle member movement by positioning one of the apertures 15 or 17 over the central opening will result in the delivery of the tested body to a particular collection vessel 26. In this way bodies having selected characteristics are placed together in accordance with these chosen characteristics.

The period of time consumed in moving the tested body 11 from the testing station to its eventual disposition in the appropriate collection vessel 26 should be as short as possible. In this apparatus this period can be divided into the time required to move the tested body to the central opening 18 and the time required to move the body from the central opening 18 to the appropriate passage 21. The shuttle member 10 is so designed in relation to the various catch basins 24 that as soon as the body is contained within the shuttle member 10, the shuttle member can be repositioned for the reception of another tested body. Stated otherwise, the positioning of the shuttle member 10 for the reception of a tested body does not wait upon the delivery of a body to its eventual resting place but the instant the body is received in the shuttle member the shuttle member can be moved on to receiving the next successive body. This provides for a quicker distribution of the tested bodies.

The member 10 can be moved without waiting to be free of each previous body before receiving the next body in succession because of the relationship between each port 23 and its respective wide mouth 25. The port 23 is always positioned over some portion of the wide mouth 25 regardless of the extent of lateral movement of the member 10. Therefore, the sorting speed is high because once the body enters the shuttle member the shuttle member can move to another position without waiting for the body to reach its final collection bin.

The invention has been described as embodying distributing to several receptacles however it is to be understood that this invention is not limited in the number of and nature of disposition of the sorted objects.

What is claimed is:

1. In a sorting apparatus for small discrete objects the combination of a low inert distributing member having a plurality of delivery passages capable of receiving the objects, at least two pair of diametrically positioned tension springs attached to sides of said distributing member, means for providing a fluid support for said distributing member whereby said diametrically positioned tension springs and said fluid support permit lateral motion with low inertia in all planar coordinates of said planar member, a plurality of straight lateral surfaces defining angles with each other to form the periphery of the distributing member, a plurality of means for applying a resilient pressure against said surfaces for moving said distributing member laterally in said planar coordinates within limits determined by the tension springs, a plurality of receptacles each having an opening positioned to receive the objects from a delivery passage dimensioned to receive objects from the respective delivery passage, independent of the position of the distributing member during delivery.

2. The combination claimed in claim 1 wherein the distributing member comprises a shuttle having a perforated planar member movable in a major plane, a plurality of ports perforating the planar member and said passages extending from said planar member from said ports.

3. In the combination of claim 2 an apertured member positioned adjacent the shuttle and defining a central opening through said adjacent member which opening lies within the plane area of said major plane of movement of said shuttle defined by the shuttle perimeter so constructed and arranged that objects received from the central opening by one of the ports is delivered to its receptacle through the respective passage independent of the lateral position of the shuttle.

4. The combination of claim 3 wherein the apertured member is positioned above the shuttle and the objects are delivered downwardly.

5. In the combination of claim 1 wherein the means for providing fluid support comprises air bearing means supporting said distributing member.

6. In the combination of claim 1 wherein the resilient means comprises air jets positioned around said distributing member and spring tension means attached to the distributing member.

7. The combination of claim 1 wherein the passages are delivery tubes.

* * * * *